UNITED STATES PATENT OFFICE.

JAMES J. ROGERS, OF BINGHAMTON, NEW YORK.

IMPROVEMENT IN TABLE BEVERAGES.

Specification forming part of Letters Patent No. 193,038, dated July 10, 1877; application filed March 24, 1877.

*To all whom it may concern:*

Be it known that I, JAMES J. ROGERS, of the city of Binghamton, in the State of New York, have invented a new and useful Composition for a Table Beverage, which composition is fully described in the following specification.

This invention relates to that class of fashionable drinks which are pleasant to the taste and healthful as a beverage; and it consists in a mixture of water, sugar, oil of wintergreen, cut in alcohol, brewer's yeast, and burnt sugar, which ingredients are prepared and compounded substantially in the following manner and proportions:

Take a quantity of water—say a barrel, or about thirty-two gallons of water—and in it dissolve twenty-three pounds of sugar, the kind called "C" sugar being preferable; add an ounce of oil of winter-green, cut in a pint of alcohol; warm the whole liquid to a lukewarm temperature, and add one-half pint of brewer's yeast. Then allow it to stand a short time—say about twelve hours—and skim it. Then add one-half pound of burnt sugar, first having dissolved and carefully strained the same. Rack off the liquid into kegs or bottles, and cork tightly. In twelve hours it will be ready for use.

The above-described makes a very healthful and pleasant drink. When properly bottled and corked it will keep any length of time, and grows stronger with age.

The burnt sugar gives color to the liquid, which may be increased or diminished, as desired, by varying the amount of the sugar.

I claim—

The composition, as a table beverage, consisting of water, sugar, oil of winter-green, alcohol, yeast, and burnt sugar, in the proportions substantially as described.

JAMES J. ROGERS.

Witnesses:
ROBT. BROWN,
GEORGE GERMOND.